Feb. 4, 1947.   M. H. STRICKLAND   2,415,225
RECORDING MACHINE
Original Filed Aug. 20, 1938   6 Sheets-Sheet 1

INVENTOR:
M.H. STRICKLAND
By Albert J. McCauley
ATTORNEY.

Feb. 4, 1947.   M. H. STRICKLAND   2,415,225
RECORDING MACHINE
Original Filed Aug. 20, 1938   6 Sheets—Sheet 2

Fig. 7.

INVENTOR:
M. H. STRICKLAND
BY Albert J. McCauley
ATTORNEY.

Feb. 4, 1947.  M. H. STRICKLAND  2,415,225
RECORDING MACHINE
Original Filed Aug. 20, 1938  6 Sheets-Sheet 3

INVENTOR:
M. H. STRICKLAND
By Albert J. McCauley
ATTORNEY.

Feb. 4, 1947. M. H. STRICKLAND 2,415,225
RECORDING MACHINE
Original Filed Aug. 20, 1938 6 Sheets-Sheet 5

INVENTOR:
M. H. STRICKLAND
By Albert J. McCauley
ATTORNEY.

Patented Feb. 4, 1947

2,415,225

UNITED STATES PATENT OFFICE 2,415,225

RECORDING MACHINE

Merton H. Strickland, St. Louis, Mo.

Original application August 20, 1938, Serial No. 225,909, now Patent No. 2,336,813, dated December 14, 1943. Divided and this application November 9, 1943, Serial No. 509,597

7 Claims. (Cl. 235—138)

This invention relates to recording machines, and more particularly to a machine for printing numerals on successive sheets and recording the totals of said numerals. The present application is a division of an application for patent on recording machines filed by me on August 20, 1938, Serial No. 225,909, which matured as Patent No. 2,336,813 dated December 14, 1943.

The recording machine herein described may be used by collectors who obtain various sums of money from numerous sources and are required to give a receipt for each amount collected. The recording machine is so constructed that it can be manually set by the collector to print the amount of any collection on a work sheet, such as a receipt card, and the total of the several amounts printed will be recorded to show the total sum collected.

An object of the invention is to provide the totalizer with an effective carrying mechanism for imparting motion from one numeral wheel to another numeral wheel after said wheels have been driven in accordance with the setting of the printing mechanism.

With the foregoing and other objects in view, the invention comprises the novel construction, combination and arrangement of parts hereinafter more specifically described and shown in the accompanying drawings, which illustrate one form of the invention. However, it is to be understood that the invention comprehends changes, variations and modifications within the scope of the claims hereunto appended.

Figure 25:
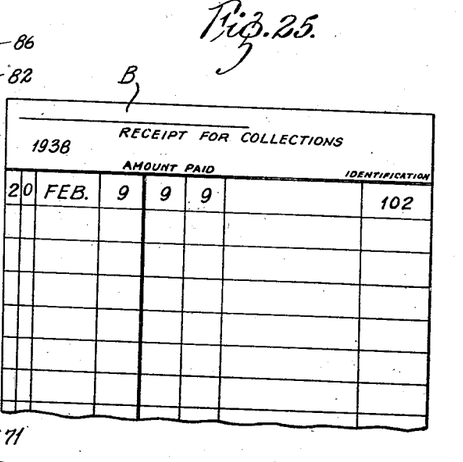
Fig. 25 is a detail view of a portion of the work sheet, which may be in the form of a card.

To illustrate the invention, I have shown the recording device as including a housing A provided with a printing mechanism at the bottom for printing the date, the amount collected, and an identifying number on an insurance receipt card B, such as shown in Fig. 25, and a totalizing device near the top for recording the totals of the amounts printed on such receipt card.

The housing A includes a top wall 1, side walls 2 and 3, a rear wall 4, and a removable front wall 5 provided at its lower portion (Figs. 4 and 7) with ears 6 pivotally supported on pins 7 secured to said side walls. The upper portion of the removable front wall 5 is provided with a lock 8 (Figs. 2 and 8) for detachably securing said front wall 5 to the top wall 1.

Figure 7:
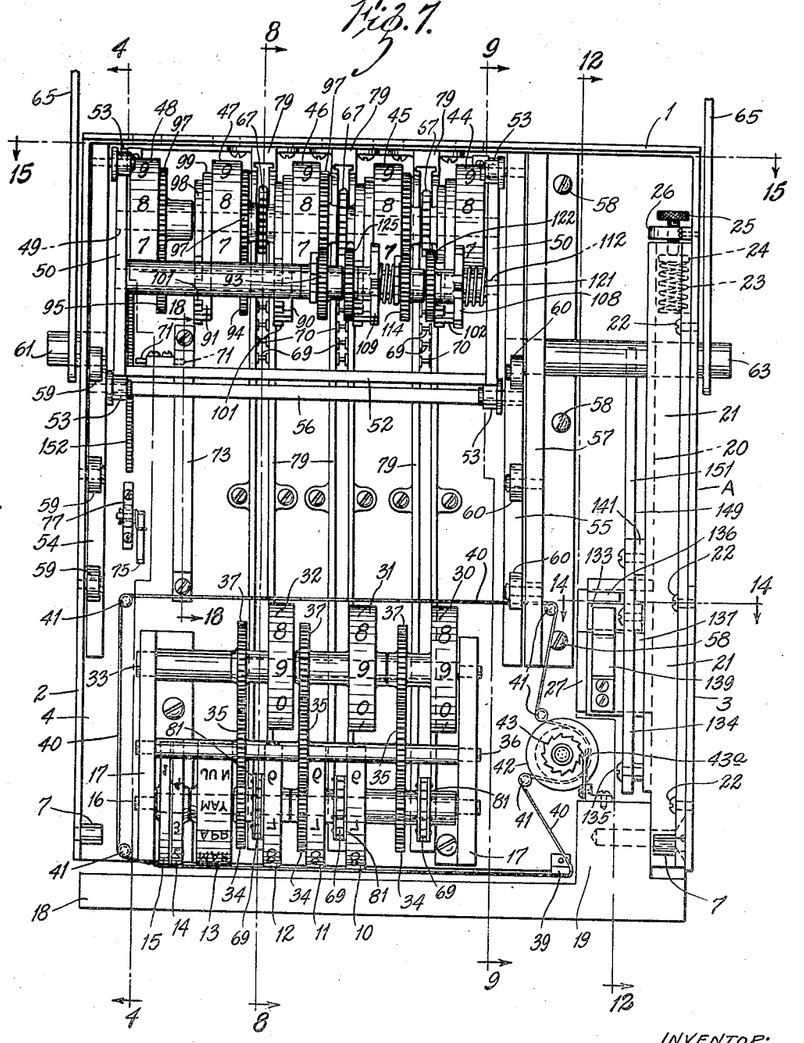
Fig. 7 is a vertical section on a large scale showing the totalizer at the top of the view, the manually adjustable setting wheels below the totalizer, and the printing wheels near the bottom of the machine.

The printing mechanism includes type carriers in the form of type wheels 10, 11 and 12 for selectively printing numerals from 0 to 9 in units, tens and hundreds positions; and type wheels 13, 14 and 15 for printing the month and day thereof. The type wheels are loosely supported on a shaft 16 having its opposite ends mounted in supports 17 which are secured to the rear wall of the housing. As shown in Fig. 7, the portions of the type wheels 10 to 15 extend beyond the lower portion of the housing to provide for the transfer of print to the receipt card.

Figure 12:
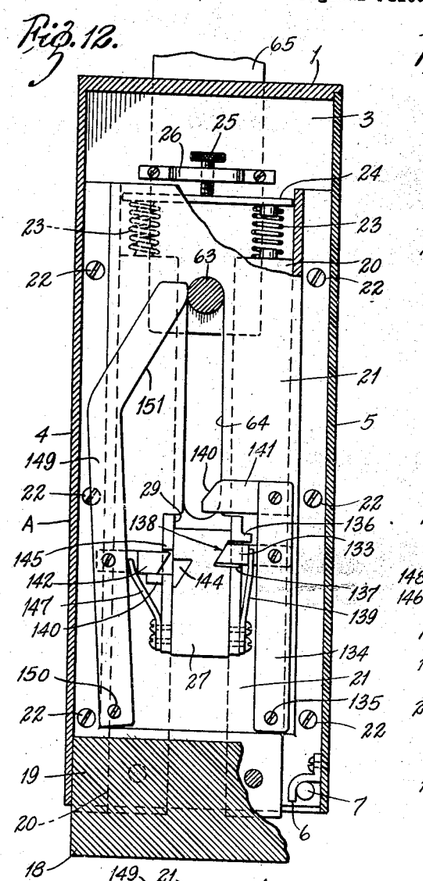
Fig. 12 is a section approximately on the line 12—12 in Fig. 7, showing a locking device positioned to prevent operation of the printing mechanism.
Figure 14:
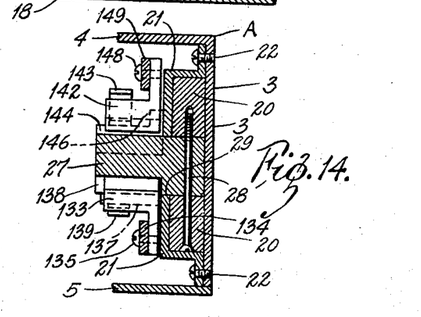
Fig. 14 is a section taken approximately on the line 14—14 in Fig. 7 showing the guide for the platen and locking elements associated therewith.

A platen 18 adapted to receive the receipt card B is located below the bottom wall of the housing adjacent the exposed portions of the type wheels. The platen 18 is provided near one end with a shoulder 19 extending upwardly into the housing. As shown in Figs. 7, 12 and 14, separated vertical guide bars 20 are fixed to the shoulder 19 and slidably confined between the side wall 3 of the housing and an inner wall 21 secured to said side wall by screws 22.

Figure 9:
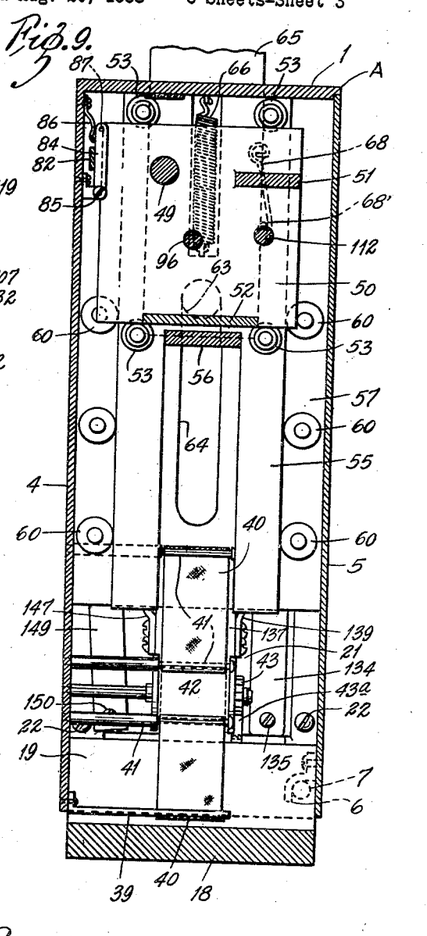
Fig. 9 is a section approximately on the line 9—9 in Fig. 7.

Springs 23 are interposed between the upper ends of the guide bars 20 and a thrust member 24 held in engagement with the upper ends of the springs by a screw 25 carried by a flange 26 fixed to the inner face of the side wall 3. The springs 23 tend to move the thrust member 24 away from the ends of the guide bars 20, thereby imparting an upward thrust through screw 25 and flange 26 to the housing. The pressure of the springs 23 yieldingly forces the housing away from the platen 18, as shown in Figs. 7, 9 and 12, to retain the type wheels and platen out of printing relationship.

It will be understood that under conditions hereafter described the housing may be manually moved toward the platen 18 to bring the type wheels into printing relationship with the platen, and the springs 23 will tend to force the housing away from the platen to move the type wheels out of printing relationship with the platen.

To limit the upward displacement of the housing and type wheels 10 to 15 away from the platen 18, an abutment member 27 is secured by a screw 28 (Fig. 14) between the guide bars 20 and extends through an elongated opening 29 in the inner wall 21. As the housing is moved upwardly by the springs 23, the edge of the inner wall at the lower portion of the opening will engage the abutment member 27 to limit the upward motion of the housing.

The type wheels 13 to 15 may be set to print the desired month and day by removing the front wall 5 and manually rotating the type wheels to move the selected month and day type adjacent the platen.

The type wheels 10 to 12 for printing the amount collected may be individually set in the desired printing positions by manually operated indicating wheels 30, 31 and 32 which are loosely supported on a shaft 33 secured to the supports 17. The means for transmitting motion from each indicating wheel to one of the type wheels 10, 11 and 12 includes a gear wheel 27 fixed to each indicating wheel, a gear wheel 34 secured to each of said type wheels, and an intermediate gear wheel 35 loosely mounted on a shaft 36 and meshing with the gear wheels 34 and 37. It will be understood that motion imparted to one of the indicating wheels 30, 31 or 32 will be transmitted through one of the sets of gear wheels 34, 35 and 37 to drive one of the type wheels 10, 11 or 12.

Figures 1, 2, 3, 4, 5, 6:
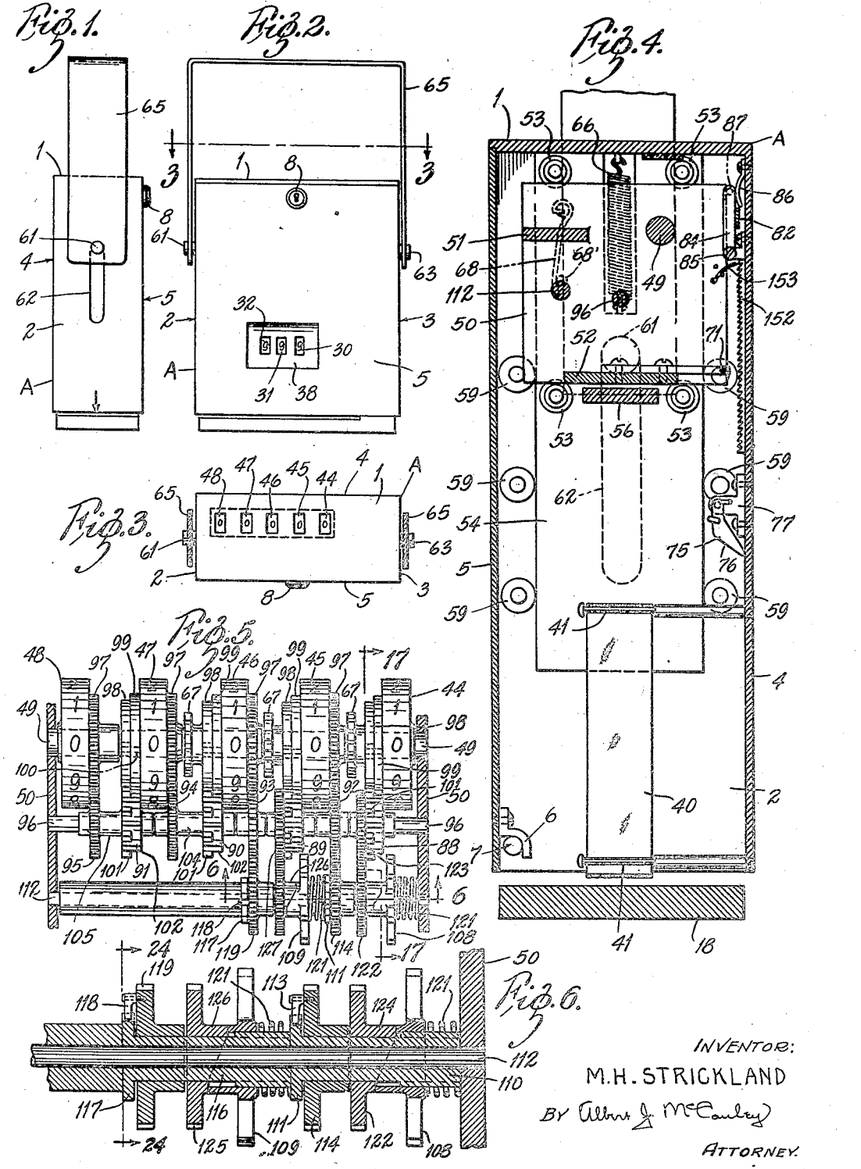
Fig. 1 is an end view of a recording machine embodying the features of this invention, showing the operating handle in an elevated position.
Fig. 2 is a front view showing portions of the indicating wheels which are exposed to the operator for adjustment in setting the machine for the amounts to be printed and recorded in the totalizer.
Fig. 3 is a top view, partly in section, showing portions of the totalizer.
Fig. 4 is a vertical section on a larger scale, taken approximately on the line 4—4 in Fig. 7, showing a portion of the vertically movable carriage connected to the operating handle, and a portion of the horizontally movable carriage supported thereby.
Fig. 5 is a diagram (not a true section) showing elements of the totalizer as they would appear when the shafts of the totalizer are separated to more clearly expose the carrying devices.
Fig. 6 is a section taken approximately on the line 6—6 of Fig. 5, drawn to a larger scale.
Figure 8:
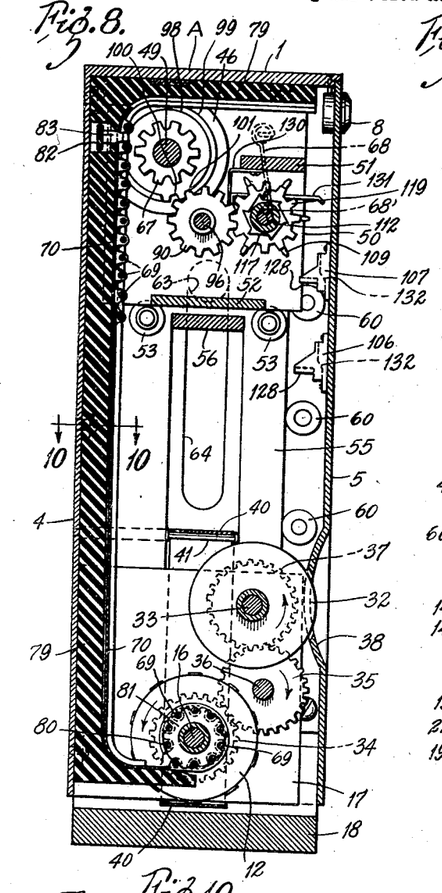
Fig. 8 is a vertical section approximately on the line 8—8 in Fig. 7.
Figures 15, 16, 17, 18, 19, 20:
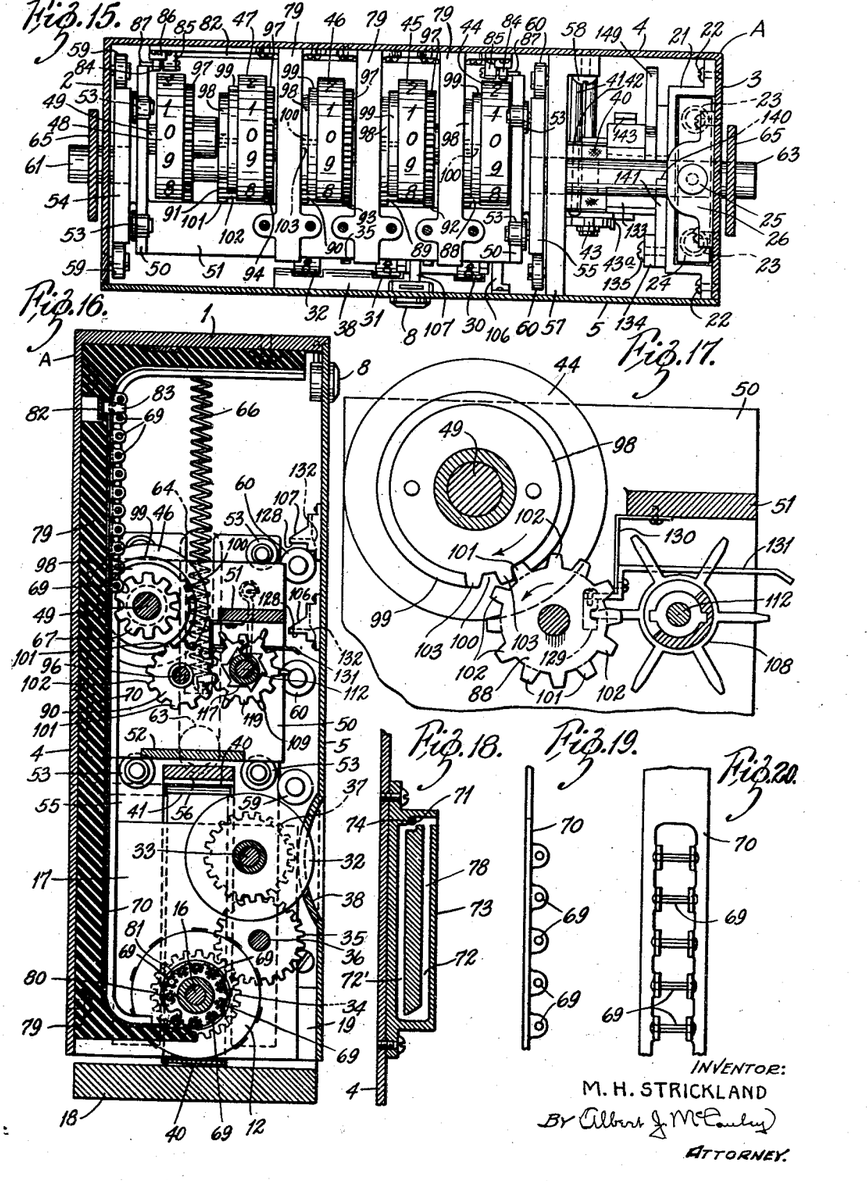
Fig. 15 is a horizontal section approximately on the line 15—15 in Fig. 7.
Fig. 16 is a vertical section, similar to Fig. 8, showing the totalizer in a lower position, as it appears when the operating handle has been depressed.
Fig. 17 is an enlarged detail view of the totalizer, showing a portion of the carrying device.
Fig. 18 is a detail view taken approximately on the line 18—18 of Fig. 7 showing a guide of the totalizer carriages.
Fig. 19 is an enlarged side view showing a few of the 25 teeth or abutments in one of the flexible racks.
Fig. 20 is another view of the details shown in Fig. 19.

The peripheral face of each of the indicating wheels 30, 31 and 32 is provided with a series of numbers from 0 to 9 corresponding to the numerals on the type wheels. The front wall 5 of the housing is provided with a concave portion 38 provided with openings adapted to expose a numeral on each indicating wheel. As shown in Figs. 2, 8 and 16, the indicating wheels partially project through said openings to provide for a manual adjustment of said indicating wheels.

The numbers on each of the indicating wheels 30, 31 and 32 are so arranged, that when a number is exposed at one of the openings in the front wall, a corresponding number on one of the type wheels will be located adjacent the platen to provide for the printing of said number. In other words, if the indicating wheels are moved to expose, for example, 999, at the openings in the front wall 5 (Fig. 2), the type wheels 10, 11 and 12 will be driven by the gears 34, 35 and 37 to locate the type characters 999 in positions adjacent to the platen 18.

It will be observed that the type wheels 10, 11 and 12 for printing the amounts received by the collector may be manually adjusted by the indicating wheels while the front wall 5 is locked to prevent access to interior of the machine, and the collector cannot change the date wheels 13, 14 and 15 while said wall is locked. Therefore, while the collector may adjust the type wheels to print the amount received he cannot postdate or predate the receipt.

If desired, the rear wall of the machine may be provided with a fixed type member 39 projecting below the lower edge of said wall for printing a number to identify the machine employed to print the receipt. This type member appears in Fig. 7, and the identification character printed thereby appears as the numeral 102 in Fig. 25.

To provide for the supply of ink to the type wheels 10 to 15 and type member 39, an endless ribbon 40 passes under said type wheels and type member, over guides 41 and around a driving wheel 42, as shown in Fig. 7. The driving wheel 42 is rotatably supported in the housing and is adapted to be intermittently driven by a toothed wheel 43 actuated during each downward movement of the housing by a spring pressed abutment 43a fixed to the shoulder 19 of the platen.

As an illustration of a suitable totalizing device for indicating the totals of amounts printed by the type wheels 10, 11 and 12, I have shown a series of numeral wheels 44, 45, 46, 47 and 48 loosely mounted on a shaft 49 and adapted to expose the total of the amounts collected at sight openings in the top wall of the housing, as shown in Fig. 3.

The shaft for supporting the numeral wheels 44 to 48 is secured at opposite ends to side walls 50 which are connected by horizontal bars 51 and 52 to form a horizontally movable carriage. This carriage is slidably confined between rollers 53 on a manually operated vertically movable carriage which includes side walls 54 and 55 secured to each other by a bar 56.

Figure 21:
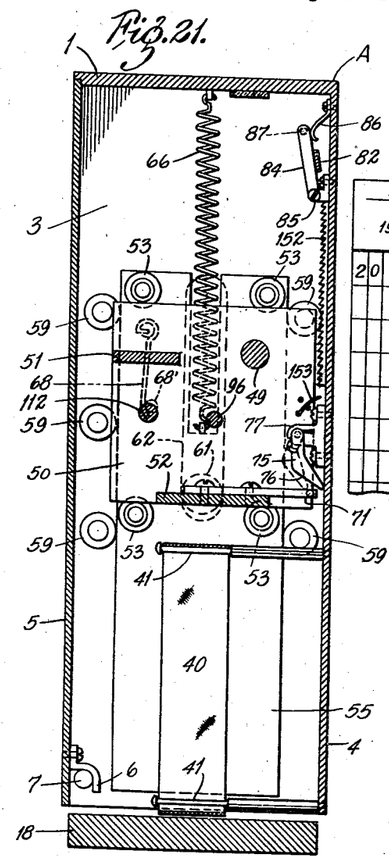
Fig. 21 is a vertical section, showing several parts of the machine as they appear when the operating handle is depressed.

The manually operated carriage is adapted to be moved vertically away from an elevated or starting position, such as shown in Figs. 4, 7, 8 and 9, to a lower position, such as shown in Figs. 16 and 21, and then back to said starting position. To prevent lateral displacement of the manually operated carriage during its longitudinal movements, it is confined between the side wall 2 of the housing and a vertical inner wall 57 secured to the rear wall of the housing by screws 58 as shown in Fig. 7. The side wall 2 of the housing is provided with guide rollers 59 adapted to engage opposite edges of the side wall 54 of the carriage, and the inner vertical wall 57 is likewise provided with guide rollers 60 engaging opposite edges of the other side wall 55 of the carriage.

As an illustration of a means for moving the carriage from its starting position (Figs. 4, 7, 8 and 9) to the position shown in Figs. 16 and 21, I have shown a relatively short rod 61 secured to the side wall 54 of the carriage and extending through an elongated slot 62 in the side wall 2 of the housing, and a relatively long rod 63 secured to the other side wall 55. This long rod 63 extends through an elongated slot 64 in the inner wall 21 and also through a similar slot in the side wall 3 of the housing respectively. As shown in Figs. 1, 2, 3 and 7, a manually operated handle 65 is secured to the exposed portions of the rods 61 and 63. It will, therefore, be understood that a downward pressure on the handle 65 will be transmitted through said rods to move the carriage from its elevated position to a lower position, such as shown in Figs. 16 and 21. The carriage may be manually restored to its starting position by the handle 65. However, I have shown springs 66 secured to the top wall of the housing and to the side walls of the carriage, as shown in Figs. 4, 9, 16 and 21, for restoring the carriage to its elevated or starting position. These springs 66 are tensioned during the downward movement of the carriage and will restore said carriage to its elevated position upon release of downward pressure on the operating handle 65.

During the movement of the vertically movable carriage away from and back to its starting or elevated position, it will be observed that the horizontally movable carriage which supports the totalizing mechanism moves longitudinally with the manually operated carriage, and that said inner carriage is free to be moved horizontally on the rollers 53.

I will now refer to the means for driving the totalizing device in accordance with the setting of the printing wheels 10, 11 and 12. An operating member in the form of a gear wheel 67 is secured to each of the numeral wheels 44, 45 and 46 of the totalizing device. When the vertically movable carriage is moved downwardly from its elevated position, a spring 68 fixed to the wall 50 of said carriage and tensionally engaging an abutment 68' on one of the side walls of the horizontally movable carriage shifts the last mentioned carriage laterally to move the gear wheels 67 from inoperative positions into alinement with teeth 69 on flexible racks 70. At the beginning of the return stroke of the vertically movable carriage, the horizontally movable inner carriage is forcibly shifted laterally away from the flexible racks so that the gear wheels 67 will be out of alinement with the teeth 69 of the racks during the return movement.

The means for guiding said horizontally movable carriage during its movement with the vertically movable carriage away and back to its elevated position includes a guide pin 71 (Figs. 7, 18 and 21) secured to the bar 52 and extending into an endless slot 72 (Fig. 18) of a cam 73.

Fig. 18 shows the position of the guide pin 71 in the slot when the totalizer occupies its elevated position. It will be observed that the guide pin 71 contacts with a shoulder 74 to hold the horizontally movable inner carriage against the pressure of the spring 68 in a position, such as shown in Fig. 8, where the gear wheels 67 are out of engagement with the teeth 69 of the racks. Downward movement of the carriages will displace said guide pin 71 from the shoulder 74 permitting the spring 68 to move the inner carriage horizontally and bring the gear wheels 67 into alinement with the teeth 69 of the racks 70. During the continued downward movement of the carriages, the vertical passageway 72' of the slot 72 (Fig. 18) will cooperate with the pin 71 to hold the gear wheels 67 in alinement with the teeth 69 of said racks. At the completion of the downward movement of the carriages, an end portion of the guide pin 71 trips a spring actuated dog 75 (Fig. 21) and passes below a cam face 76 of said dog which may be pivotally mounted on a support 77. On the return stroke of the carriages, the cam face 76 of the dog 75 will positively deflect the pin 71 from the passageway 72' into a vertical passageway 78 of the slot 72, to shift the horizontally movable carriage away from the racks, thereby moving the gear wheels 67 out of alinement with the teeth 69 of the racks. When the carriages reach their elevated positions, the spring 68 will shift the inner carriage laterally toward the racks, but the pin 71 will strike the shoulder 74 (Fig. 18) to limit the movement of said carriage, thereby retaining the gear wheels 67 out of alinement with the teeth of the racks.

It will, therefore, be observed that during the movements of the totalizer carriage away from and back to its starting position, the inner carriage is shifted laterally in opposite directions on the outer carriage so that during substantially all of the downward movement of the carriages, the gear wheels 67 for driving the numeral wheels 44, 45 and 46 are in alinement with the teeth of the racks 70, and during the upward return movement of said carriages said gear wheels are out of alinement with said teeth of the racks.

It will be understood that during the downward movement of the totalizer, the rotary movement of the gear wheels 67 for driving the numeral wheels are controlled by the number of teeth on the racks extending into the paths of said gear wheels. In other words, if, for example, nine teeth on one of the racks 70 extend into the path of one of the gear wheels 67, said gear wheel will be driven nine steps to impart a similar motion to one of the numeral wheels. Or, if all of the teeth on said rack are out of the path of said gear wheel, it will not be actuated to drive a numeral wheel.

The number of teeth on the racks located in the paths of said gear wheels is determined by the positions of the printing wheels 10, 11 and 12. Each rack is slidably secured in a guide 79 and has a lower end fastened at 80 to a gear wheel 81 fixed to one of the printing wheels. The lower portion of each rack is provided with teeth 69 adapted to extend around and mesh with one of said gear wheels 81, so as to move the upper teeth of the rack into and out of the path of the gear wheel for the corresponding numeral wheel of the totalizer.

The teeth 69 in the lower portion of each rack and the teeth of each gear wheel 81 are so arranged that they will cooperate with each other to locate a number of upper teeth 69 in the path of a gear wheel 67 corresponding to the settling of a printing wheel. In other words, whenever one of the printing wheels 10, 11 or 12 is moved to print a selected number, the same number of teeth 69 are moved into the path of one of the gear wheels 67 of the totalizer.

Figure 10:
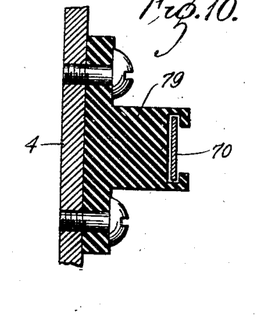
Fig. 10 is an enlarged detail view on the line 10—10 in Fig. 8, showing a plain portion of one of the elongated flexible racks, or chains, and the guide in which it is mounted.
Figure 11:
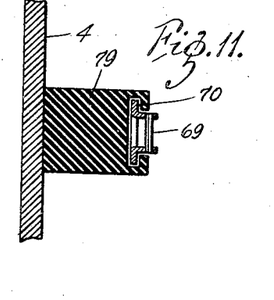
Fig. 11 is a similar view showing a toothed portion of the flexible rack.

As shown in Figs. 19 and 20, the racks 70 may be made of simple flexible strips of suitable material, and have integral oppositely disposed ears extended laterally and joined by rods 69 to form teeth therein. The construction of the guides for the racks is most clearly shown in Figs. 10 and 11. As shown in Figs. 8 and 16, the guides extend from positions immediately below the gear wheels 81 on the printing wheels, to the side wall 4, upward along said wall, and under the top wall 1, the portion of the guide at the top wall being adapted to receive the upper portion of the racks whenever they are moved above the gear wheels.

Since the gear wheels 67 are out of engagement with the teeth of the racks, when the totalizer is in its elevated position, the racks may be freely moved by the setting of the printing wheels, without actuating the totalizing mechanism. However, to prevent displacement of the racks and printing wheels secured thereto while the totalizing device is being actuated, the racks are preferably locked. The means for locking the racks (Figs. 8 and 9) includes a bar 82 having locking projections 83 adapted to be moved into and out of the path of the teeth of the rack. The bar 82 is fixed to arms 84 pivotally secured at 85. Springs 86 yieldingly engage the upper portions of said arms, and tend to swing said arms on their pivots to move the locking projections into the path of the teeth of the racks.

The upper portions of the arms 84 are provided with pins 87 adapted to engage the upper marginal side edges of the walls 50 of the inner totalizer carriage when said carriage is in the position shown in Fig. 4 to prevent the springs 86 from actuating the arms 84 to move the projections 83 into locking engagement with the teeth of the racks. In other words, when the totalizer occupies its highest position, the racks are unlocked and free to move in response to adjustments of the printing wheels. When the totalizer is moved downwardly, the walls 50 will be immediately moved out of engagement with the pins 87 on the arms 84, thereby permitting the springs 86 to shift said arms to lock the racks. The racks will remain in a locked condition until the totalizer has moved downwardly to the position shown in Figs. 16 and 21 and returns to its elevated position where the spring 68 shifts the carriage laterally into engagement with the pins 87 on the arms 84 to move the projections 83 out of locking engagement with the racks.

The numeral wheels of the totalizer are provided with numbers from 0 to 9, and as these wheels are advanced to record the various amounts printed by the type wheels, each of the lower denomination numeral wheels 44 to 47 may pass from 9 to 0 requiring a carrying operation to the next higher denomination.

As an illustration of a suitable carrying mechanism, I have shown (Figs. 5, 6, 7, 8 and 17) a series of driven gears 88, 89, 90 and 91, and intermediate gears 92, 93, 94 and 95 loosely mounted on a shaft 96 supported by the side walls 50 of the totalizer carriage. Each of the intermediate gears 92 to 95 meshes with a large gear 97 fixed to one of the numeral wheels 45 to 48, and the several intermediate gears 92 to 95 are rotatable independently of each other to transmit motion to said numeral wheels 45 to 48.

The means for driving each of the driven gears 88 to 91 includes a disk 98 having two teeth 103 and a larger disk 99 having a notch 100 (Fig. 17) registering with the opening between the teeth of the disk 98. As shown in Fig. 5, a pair of said disks 98 and 99 is fixed to each of the numeral wheels 44 to 47, and the driven gear wheels 88 to 91 have alternate short teeth 101 and long teeth 102. Two of the long teeth of each of said driven gear wheels normally engage the periphery of one of the large disks 99 (Fig. 17) to lock said driven gears, and a short tooth 101 located between said two long teeth, normally extends into the path of the teeth 103 on each disk 98.

Whenever one of the numeral wheels 44 to 47 is moved from 9 to 0, the teeth 103 on the disk 98 fixed to the last mentioned numeral wheel will drive one of the driven gears a distance of two teeth, the notch 100 in the large disk permitting one of the long teeth 102 on said driven gear wheel to move between the teeth 103 of said disk 98.

As shown in Fig. 5, the driven gear wheel 90 and intermediate gear wheel 94 are secured to each other by a sleeve 104. It will, therefore, be understood that whenever the driven gear 90 is moved, this motion is directly transmitted through the intermediate gear wheel 94 to the large toothed gear wheel 97 meshing therewith to drive the numeral wheel 47 a tenth of a revolution.

The driven gear wheel 91 and intermediate gear wheel 95 are also secured to each other by a sleeve 105, to provide for the direct transfer of motion from the numeral wheel 47 to the numeral wheel 48 whenever said numeral wheel 47 passes from 9 to 0.

When the totalizer is moved downwardly from its starting position, the units, tens and hundreds numeral wheels 44, 45 and 46 may be simultaneously driven by the gear wheels 67 in accordance with the settings of the racks 70. While these wheels are being driven through the medium of the racks, the units and tens wheels may pass from 9 to 0, requiring the tens and hundreds wheels to be advanced one step. However, the tens and hundreds wheels 45 and 46 cannot be directly driven from the lower denomination wheels, as the gear wheels 67 fixed to said tens and hundreds wheels may be in engagement with the teeth of the racks.

Therefore, to provide for a carrying operation to the tens and hundreds wheels, I have shown a means for moving said tens and hundreds wheels during the return stroke of the totalizer carriage when the gear wheels 67 are out of engagement with the teeth 69 of the racks.

The means for driving the tens and hundreds wheels (45 and 46) during the return stroke of the totalizer includes abutment members 106 and 107 fixed to the wall 5 and star wheels 108 and 109 slidable into and out of alinement with said abutment members. The star wheel 108 is slidably splined on a sleeve 110 secured to a ratchet wheel 111 loosely supported on a shaft 112. The ratchet wheel 111 is adapted to transmit motion through a pawl 113 to a gear wheel 114 which meshes with the intermediate gear wheel 92 for driving the large gear wheel 97 on the tens wheel 45. It will, therefore, be understood that whenever the star wheel 108 is driven, motion will be transmitted through sleeve 110, ratchet wheel 111, pawl 113, and gears 114, 92 and 97 to drive the tens wheel.

The star wheel 109 is likewise slidably splined to a sleeve 116 which is provided with a ratchet wheel 117 for transmitting motion through a pawl 118 to a gear wheel 119 meshing with the intermediate gear wheel 93 for driving the gear wheel 97 fixed to the hundreds wheel 46.

Figure 22:
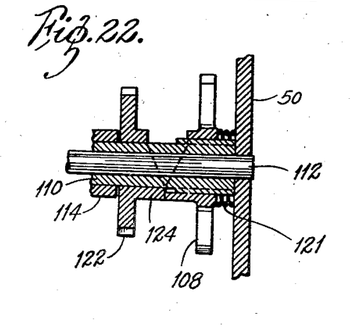
Fig. 22 is a sectional detail showing a cam for shifting a carrying wheel.

The star wheels 108 and 109 are slidable on the sleeves 110 and 116 and are adapted to be moved laterally from a position, such as shown in Fig. 5, to a position, such as shown in Fig. 22. When the star wheel 108 occupies the position shown in Fig. 22, it will be in alinement with the abutment 106 on the return stroke of the totalizer carriages and will be driven by said abutment to move the tens numeral wheel one step or a tenth of a revolution. Likewise when the star wheel 109 is shifted so as to lie in alinement with the abutment 107, it will be actuated thereby during the return stroke of the totalizer carriages to move the hundreds numeral wheel one step.

The star wheels 108 and 109 are normally held out of alinement with the abutments 106 and 107 by compression springs 121 engaging said star wheels. However, when the units wheel 44 passes from 9 to 0, the star wheel 108 is forcibly shifted so that it will be in alinement with the abutment 106 during the return stroke of the totalizer carriages. The star wheel 109 is also forcibly shifted during the movement of the tens wheel from 9 to 0, so that said star wheel 109 will lie in alinement with the abutment 107 during said return stroke of the carriages.

The means for forcibly shifting the star wheel 108 whenever the units wheel passes from 9 to 0 includes a gear wheel 122 meshing with a gear 123 attached to the driven gear 88 which is actuated by the two teeth 103 on the disk 98 fixed to the units wheel. The gear wheel 122 is loosely mounted on the sleeve 110 and provided with a hub 124 having a cam face adapted to engage a cam face on a hub of the star wheel 108. Whenever the gear wheel 122 is moved, the cam faces on said hubs will cooperate with each other to shift the star wheel 108 laterally so that it will lie in alinement with the abutment 106 during the return stroke of the carriages.

The means for forcibly shifting the star wheel 109 whenever the tens wheel 45 passes from 9 to 0 is similar in construction to the mechanism for shifting the star wheel 108, and includes a gear wheel 125 loosely mounted on the sleeve 116 and provided with a hub 126 having cam face engaging another cam face on the hub of the star wheel 109. The gear wheel 125 meshes with a gear 127 attached to the driven gear wheel 89, and upon being moved by said driven gear wheel 89 the cam face on the hub 126 of the gear wheel 125 will cooperate with the cam face on the hub of the star wheel 109 to impart a lateral movement to this star wheel, thereby providing for actuation of said star wheel through the medium of the abutment 107.

Figure 23:
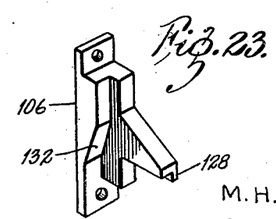
Fig. 23 is a perspective view of a part of the carrying device.
Figure 24:
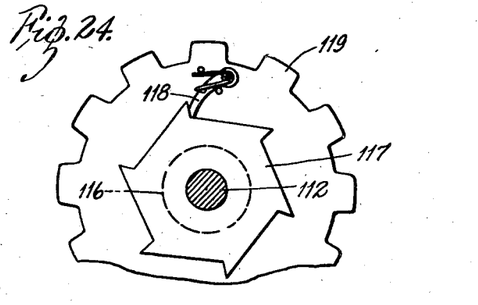
Fig. 24 is a detail view showing a ratchet and pawl which forms part of the carrying device.

When the star wheels 108 and 109 are actuated by the abutments 106 and 107, it will be observed that as said wheels are rotated and the cam faces on the hubs of said wheels are moved into alignment with the cam faces of the hubs of the gear wheels 122 and 125, the springs 121 will tend to shift the star wheels laterally. To prevent a lateral displacement of the star wheels while they are being driven by the abutments 106 and 107, each of said abutments is provided with a depending flange 128 (Figs. 8, 16 and 23) adapted to engage a tooth of the star wheel being actuated until the star wheel is driven the required distance.

As shown in Figs. 8 and 16, the abutment 107 is at a higher elevation than the abutment 106 so that the star wheel 109 will be driven subsequent to the operation of the star wheel 108. Therefore, whenever the tens wheel 45 is moved from 9 to 0 by the star wheel 108, the star wheel 109 will be shifted into alinement with the abutment 107 to provide for a subsequent carrying operation to the hundreds wheel 46.

The star wheels 108 and 109 are normally locked to prevent rotation. The locking device may include locking members 129 which are yieldingly held in engagement with the star wheels by means of spring arms 130 secured to the totalizer carriage. Each of the spring arms 130 is provided with an unlocking member 131 for separating the locking member 129 from the star wheels while they are being driven by said abutment 106 and 107. The means for actuating each of said unlocking members includes a cam face 132 on each of the abutments adapted to engage an end of one of said unlocking members 131 to shift the spring arm 130 attached thereto away from the star wheel to be driven, thereby moving the locking member secured to said last mentioned spring arm out of engagement with said star wheel.

Attention is now directed to the means for controlling the printing operation of the type wheels 10, 11 and 12. While the totalizer carriage is moving downwardly to actuate the totalizing mechanism, the type wheels 10 to 12 and platen 18 are preferably locked out of printing relationship, as shown in Fig. 12. After the totalizing device has been completely actuated and the carriage reaches its lowest position, the printing wheels are moved into printing relationship with the platen, and said printing relationship is maintained to clamp the card between the printing wheels and platen until the carriage returns to its elevated or starting position.

The means for locking the printing wheels and platen out of printing relationship while the carriage is moved downwardly substantially a full stroke to actuate the totalizing device includes a latch member 133 carried by an arm 134 pivotally secured at 135 to the inner wall 21 of the housing. The latch member 133 is slidably supported between projecting guide members 136 and 137 on the inner wall 21, and is movable into and out of a notch 138 in the abutment member 27 which is secured to bars 20 carried by the platen 18. A spring 139 fastened to the extension 137 on the inner wall 21 engages said latch member 133 to yieldingly hold the same in said notch. The latch member 133 while located in said notch, as shown in Fig. 12, will prevent downward movement of the housing to bring the printing wheels into printing relationship with the platen.

When the manually operated totalizer carriage has moved downwardly substantially a full stroke, the rod 63 secured to said carriage engages a cam face 140 on an unlocking member 141 fixed to the pivoted arm 134 to move the latch 133 out of locking engagement with the abutment member 27. The housing may then be manually moved downwardly to bring the printing wheels into printing relationship with the platen.

Figure 13:
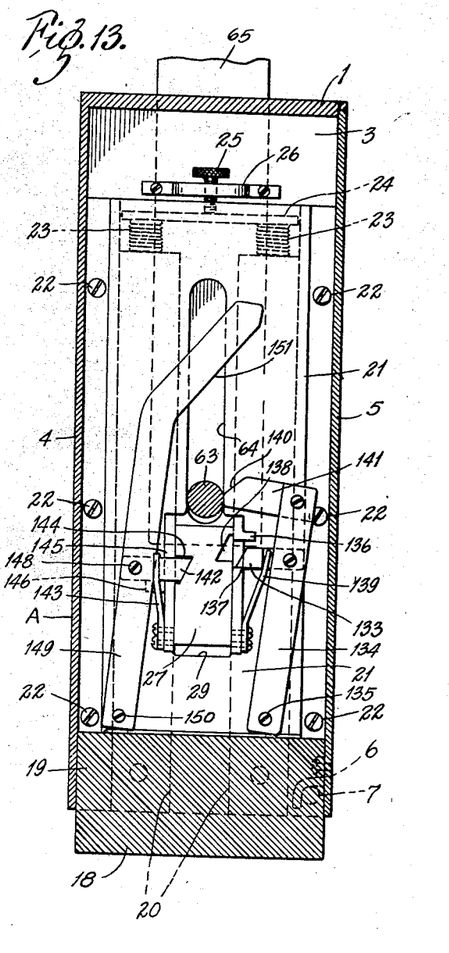
Fig. 13 is a similar view showing the locking elements as they appear when the machine is locked in its printing condition.

When the housing is moved downwardly to the position shown in Fig. 13, a slidable latch member 142 is forced by a spring 143 into a notch 144 in the abutment member 27 to lock the printing wheels and platen 18 in printing relationship. The latch member 142 is slidably supported between guide members 145 and 146 fixed to the inner wall 21. The spring 143 for forcing said latch member 142 into the notch 144 may be secured to the inner wall 21, and provided with an upper portion engaging said latch member.

The latch member 142 will retain the printing wheels in printing relationship with the platen to prevent removal of the card receiving the printing until the totalizer carriage returns to its upper starting position. The latch 142 is secured by a screw 148 to an arm 149 having a lower portion pivotally mounted at 150 on the inner wall. The upper portion of the arm 149 has a cam face 151 adapted to be engaged by the rod 63 on the return stroke of the carriage, to shift the latch member 142 out of the notch. The latch member is completely withdrawn from the notch when the carriage returns to its starting position. Upon the release of the latch member 142, the springs 23 will force the housing upwardly to move the printing wheels away from the platen thereby releasing the card which has received the printing.

When the housing has moved upwardly from the position shown in Fig. 13 to the position shown in Fig. 12, the spring 139 will force the latch member 133 into the notch 138 to prevent a second printing operation until the carriage is again moved a full stroke away from its upper starting position.

In Figures 4 and 21 I have shown a full stroke device for preventing a return movement of the totalizer carriage until it has made approximately a full stroke away from its starting position. The full stroke device includes a vertical bar 152 secured to the wall 4 and having ratchet teeth adapted to be engaged by a pawl 153 secured to the side wall 50 of the totalizer carriage. As the totalizer carriage is shifted laterally at the beginning of its downward stroke to move the gear wheels 67 into alinement with the teeth of the racks 70, the pawl 153 is moved into engagement with the ratchet teeth of the bar 152 to prevent upward movement of the carriage. At the start of the return movement of the totalizer carriage when it is shifted laterally to move the gear wheels 67 out of alinement with teeth of the racks, the pawl 153 is also moved out of alinement with the ratchet teeth of the bar 152 to permit upward movement of the carriage.

I claim:

1. A recording machine having a totalizing device including rotatable numeral wheels, said totalizing device being movable away from and back to a starting position, actuating means for simultaneously moving said numeral wheels during the movement of the totalizing device away from said starting position, and carrying devices for imparting motion to a plurality of said numeral wheels during the return movement of the totalizer to said starting position, said carrying devices including carrying wheels selectively movable from inoperative to operative positions, and means adapted to successively operate said carrying wheels during the return movement of the totalizer.

2. A recording machine having a totalizing device including rotatable numeral wheels, said totalizing device being movable away from and back to a starting position, actuating means for simultaneously moving said numeral wheels during the movement of the totalizing device away from said starting position, and carrying devices for imparting motion to a plurality of said numeral wheels during the return movement of the totalizer to said starting position, said carrying devices including carrying wheels, abutment members at different elevations adapted to successively operate said carrying wheels, and means for selectively moving said carrying wheels into alinement with the abutment members.

3. A recording machine having a totalizing device including rotatable numeral wheels, said totalizing device being movable away from and back to a starting position, actuating means for simultaneously moving a plurality of said numeral wheels during the movement of the totalizing device away from said starting position, and carrying means for driving one of said numeral wheels subsequent to the operation of said actuating means, said carrying means comprising a fixed abutment member, a rotatable carrying wheel for driving said last mentioned numeral wheel, said carrying wheel being slidable into and out of alinement with said abutment member, and means adapted to be actuated by another of said numeral wheels during the movement of the totalizing device away from said starting position to shift said carrying wheel so that it will lie in alinement with said abutment during the return movement of the totalizing device.

4. A recording machine having a totalizing device movable away from and back to a starting position, said totalizing device including rotatable numeral wheels adapted to be driven during the movement of the totalizing device away from said starting position, and carrying means adapted to be actuated at a predetermined interval in a revolution of one of said numeral wheels to impart motion to another numeral wheel during the return movement of the totalizing device to said starting position, said carrying means comprising a fixed abutment member, a rotatable carrying wheel for driving said last mentioned numeral wheel, said carrying wheel being slidable into and out of alinement with said abutment member, and means actuated at said predetermined interval in the revolution of the first mentioned numeral wheel to shift said carrying wheel so that it will lie in alinement with said abutment during the return movement of the totalizing device.

5. A recording machine having a totalizing device movable away from and back to a starting position, said totalizing device including rotatable numeral wheels adapted to be driven during the movement of the totalizing device away from said starting position, and carrying means adapted to be actuated at a predetermined interval in a revolution of one of said numeral wheels to impart motion to another numeral wheel during the return movement of the totalizing device to said starting position, said carrying means comprising a fixed abutment member, a rotatable carrying wheel for driving said last mentioned numeral wheel, said carrying wheel being slidable into and out of alinement with said abutment member, and cam means actuated during a revolution of the first mentioned numeral wheel to shift said carrying wheel so that it will be driven by said abutment member during the return movement of the totalizing device.

6. A recording machine having a totalizing device movable away from and back to a starting position, said totalizing device including rotatable numeral wheels adapted to be driven during the movement of the totalizing device away from said starting position, and carrrying means adapted to be actuated at a predetermined interval in a revolution of one of said numeral wheels to impart motion to another numeral wheel during the return movement of the totalizing device to said starting position, said carrying means comprising a fixed abutment member, a rotatable carrying wheel for driving said last mentioned numeral wheel, said carrying wheel being slidable into and out of alinement with said abutment member, means adapted to be actuated during a revolution of the first mentioned numeral wheel to shift said carrying wheel so that it will be driven by said abutment member during the return movement of the totalizing device, a locking device for normally preventing rotation of said carrying wheel, and means for unlocking said locking device to permit operation of the carrying wheel by said abutment member.

7. A recording machine having a totalizing device movable away from and back to a starting position, said totalizing device including rotatable numeral wheels adapted to be driven during the movement of the totalizing device away from said starting position, and carrying means adapted to be actuated at a predetermined interval in a revolution of one of said numeral wheels to impart motion to another numeral wheel during the return movement of the totalizing device to said starting position, said carrying means comprising a fixed abutment member, a rotatable carrying wheel for driving said last mentioned numeral wheel, said carrying wheel being slidable into and out of alinement with said abutment member, means adapted to be actuated during a revolution of the first mentioned numeral wheel to shift said carrying wheel so that it will be driven by said abutment member during the return movement of the totalizing device, a locking member yieldingly engaging said carrying wheel to prevent rotation thereof, and a cam for separating the locking member from the carrying wheel while it is being driven by said abutment member.

MERTON H. STRICKLAND.

REFERENCES CITED

The following references are of record in the file of this patent:

UNITED STATES PATENTS

| Number | Name | Date |
|---|---|---|
| 751,611 | Carroll | Feb. 9, 1904 |
| 1,883,853 | Bergmann | Oct. 18, 1932 |
| 1,377,269 | Odhner | May 10, 1921 |
| 1,886,781 | Collins | Nov. 8, 1932 |